(12) United States Patent
Patel et al.

(10) Patent No.: US 10,929,307 B2
(45) Date of Patent: Feb. 23, 2021

(54) MEMORY TAGGING FOR SENSITIVE DATA REDACTION IN MEMORY DUMP

(71) Applicant: International Business Machines Corporation, Armonk, NY (US)

(72) Inventors: Purvi S. Patel, Rock Hill, SC (US); Elpida Tzortzatos, Lagrangeville, NY (US); Scott B. Compton, Hyde Park, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/515,141

(22) Filed: Jul. 18, 2019

(65) Prior Publication Data

US 2021/0019264 A1    Jan. 21, 2021

(51) Int. Cl.
*G06F 12/1009*   (2016.01)
*G06F 11/07*     (2006.01)
*G06F 9/54*      (2006.01)
*G06F 12/109*    (2016.01)

(52) U.S. Cl.
CPC .......... *G06F 12/1009* (2013.01); *G06F 9/541* (2013.01); *G06F 11/0778* (2013.01); *G06F 12/109* (2013.01)

(58) Field of Classification Search
CPC .................. G06F 11/0778; G06F 12/1009
See application file for complete search history.

(56) References Cited

U.S. PATENT DOCUMENTS

| | | | |
|---|---|---|---|
| 8,260,871 B2 | 9/2012 | Fallen et al. | |
| 8,468,244 B2 | 6/2013 | Redlich et al. | |
| 9,026,860 B2 | 5/2015 | Akirav et al. | |
| 9,043,612 B2 | 5/2015 | McCoy | |
| 9,043,656 B2 | 5/2015 | Akirav et al. | |
| 2007/0033367 A1* | 2/2007 | Sakarda | G06F 12/0891 711/170 |
| 2007/0208954 A1* | 9/2007 | Van Riel | G06F 21/78 713/193 |
| 2007/0255912 A1 | 11/2007 | Kelly et al. | |
| 2008/0288548 A1 | 11/2008 | Lawler et al. | |
| 2015/0058997 A1 | 2/2015 | Lee et al. | |
| 2015/0113242 A1* | 4/2015 | Abrams | G06F 12/1458 711/163 |

(Continued)

OTHER PUBLICATIONS

Hoffman, Chris; "What is an API"; Mar. 21, 2018; retreived from : https://www.howtogeek.com/343877/what-is-an-api/ on Aug. 13, 2020. (Year: 2018).*

(Continued)

*Primary Examiner* — Edward J Dudek, Jr.
(74) *Attorney, Agent, or Firm* — Cantor Colburn LLP; Teddi Maranzano (57) ABSTRACT

Examples of techniques for memory tagging for sensitive data redaction in a memory dump are described herein. An aspect includes receiving a first call to a memory tagging application programming interface (API) from an application, wherein the first call designates a virtual memory page belonging to the application as containing sensitive data. Another aspect includes, based on the first call to the memory tagging API, tagging a physical memory page corresponding to the virtual memory page as sensitive.

20 Claims, 5 Drawing Sheets

(56) References Cited

U.S. PATENT DOCUMENTS

| | | |
|---|---|---|
| 2015/0161397 A1 | 6/2015 | Cook et al. |
| 2016/0080396 A1* | 3/2016 | Feng et al. |
| 2017/0147240 A1* | 5/2017 | Tsirkin ................ G06F 9/45558 |
| 2017/0323110 A1 | 11/2017 | Griffith et al. |
| 2019/0073473 A1* | 3/2019 | Vanderleest ........ G06F 21/6218 |

OTHER PUBLICATIONS

Anonymously; "Machine Learning Algorithms for Smart Meter Diagnostics." IP.COM, Jul. 16, 2015. 53 Pages.

Anonymously; "Phishing Kits Detection." IP.COM. Mar. 23, 2018. 4 Pages.

Bittau et al. "Wedge: Splitting Applications into Reduced-Privilege Compartments." NSDI. vol. 8. 2008. 23 Pages.

Coppola et al. "Trusted computing on heterogeneous embedded systems-on-chip with virtualization and memory protection." Cloud Computing (2013). 5 Pages.

Dalton et al., . "Raksha: a flexible information flow architecture for software security." ACM SIGARCH Computer Architecture News 35.2 (2007): 482-493.

Gonzalez, . Taxi: defeating code reuse attacks with tagged memory. Diss. Massachusetts Institute of Technology,2015. 111 Pages.

IBM "List of IBM Patents or Patent Applications Treated as Related; (Appendix P)", Filed Jul. 18, 2019, 2 pages.

Patel et al., "Memory Tagging for Sensitive Data Redaction in Memory Dump," U.S. Appl. No. 16/515,136, filed Jul. 18, 2019.

Woodruff, et al. "The Cheri capability model: Revisiting RISC in an age of risk." Computer Architecture (ISCA), 2014 ACM/IEEE 41st International Symposium on. IEEE, 2014. 12 Pages.

Zeldovich et al. "Hardware Enforcement of Application Security Policies Using Tagged Memory." OSDI. vol. 8. 2008. 16 Pages.

\* cited by examiner

MEMORY TAGGING FOR SENSITIVE DATA REDACTION IN MEMORY DUMP

BACKGROUND

The present invention generally relates to computer systems, and more specifically, to memory tagging for sensitive data redaction in a memory dump in a computer system.

Computer systems may store relatively large amounts of personal user data. Many types of websites (for example, banks, retailers, and social media) may collect and store potentially sensitive personal user data, including but not limited to names, addresses, credit card numbers, social security numbers, and personal health information on a computer system. If sensitive or otherwise protected (e.g., by data privacy regulations) user data falls into the wrong hands, legal repercussions, fraud, identify theft, or similar harm may occur. A security breach may also result in a loss of consumer trust in an organization.

SUMMARY

According to an embodiment described herein, a system can include a processor to receive a first call to a memory tagging application programming interface (API) from an application, wherein the first call designates a virtual memory page belonging to the application as containing sensitive data. The processor can also, based on the first call to the memory tagging API, tag a physical memory page corresponding to the virtual memory page as sensitive.

According to another embodiment described herein, a method can include receiving, by a processor, a first call to a memory tagging application programming interface (API) from an application, wherein the first call designates a virtual memory page belonging to the application as containing sensitive data. The method can also include, based on the first call to the memory tagging API, tagging, by the processor, a physical memory page corresponding to the virtual memory page as sensitive.

According to another embodiment described herein a computer program product may include computer readable storage medium having program instructions embodied therewith, the program instructions executable by a processing device to cause the processing device to perform a method including receive a first call to a memory tagging application programming interface (API) from an application, wherein the first call designates a virtual memory page belonging to the application as containing sensitive data. The method can also include, based on the first call to the memory tagging API, tagging a physical memory page corresponding to the virtual memory page as sensitive.

DETAILED DESCRIPTION

One or more embodiments of the present invention provide memory tagging for sensitive data redaction in a memory dump. An operating system (OS) of a computer system may generate memory dumps in response to errors. A memory dump causes the contents of a memory region to be displayed and/or stored in case of an application or system crash. The contents of the memory dump may help software developers and system administrators to diagnose, identify, and resolve a problem that caused an application or system failure. When capturing a memory dump, a dumping module gathers data to include in the dump based on options specified by the invoking program. Memory tagging allows an application to tag any virtual memory pages that contain sensitive data. The dumping module may then determine whether any data in an address space that is targeted for a memory dump is sensitive based on the memory tagging, and may redact any sensitive data in the dump.

Memory tagging may be performed via calls from an application to an application programming interface (API). The API may be supported by an OS that enables execution of the application. Calls to the API may be included in the source code of a software application by, for example, a computer programmer. A virtual memory page that is allocated to the application may be tagged as sensitive at the time of allocation. A virtual memory page may also be tagged as sensitive after allocation, and may be untagged and/or retagged as sensitive during execution of the application through subsequent API calls from the application. Using the memory tagging API, an application can identify any virtual memory pages where sensitive data will reside either at memory allocation time, or later, when the sensitive data is copied to a memory location. Based on memory locations having been identified as containing sensitive data via tagging, a post processor of the OS may redact (e.g., remove or encrypt) the data from tagged memory locations in a memory dump that includes any tagged memory locations. The redaction may prevent unauthorized personnel from gaining access to sensitive, confidential, or otherwise protected information via a memory dump.

Figure 1:
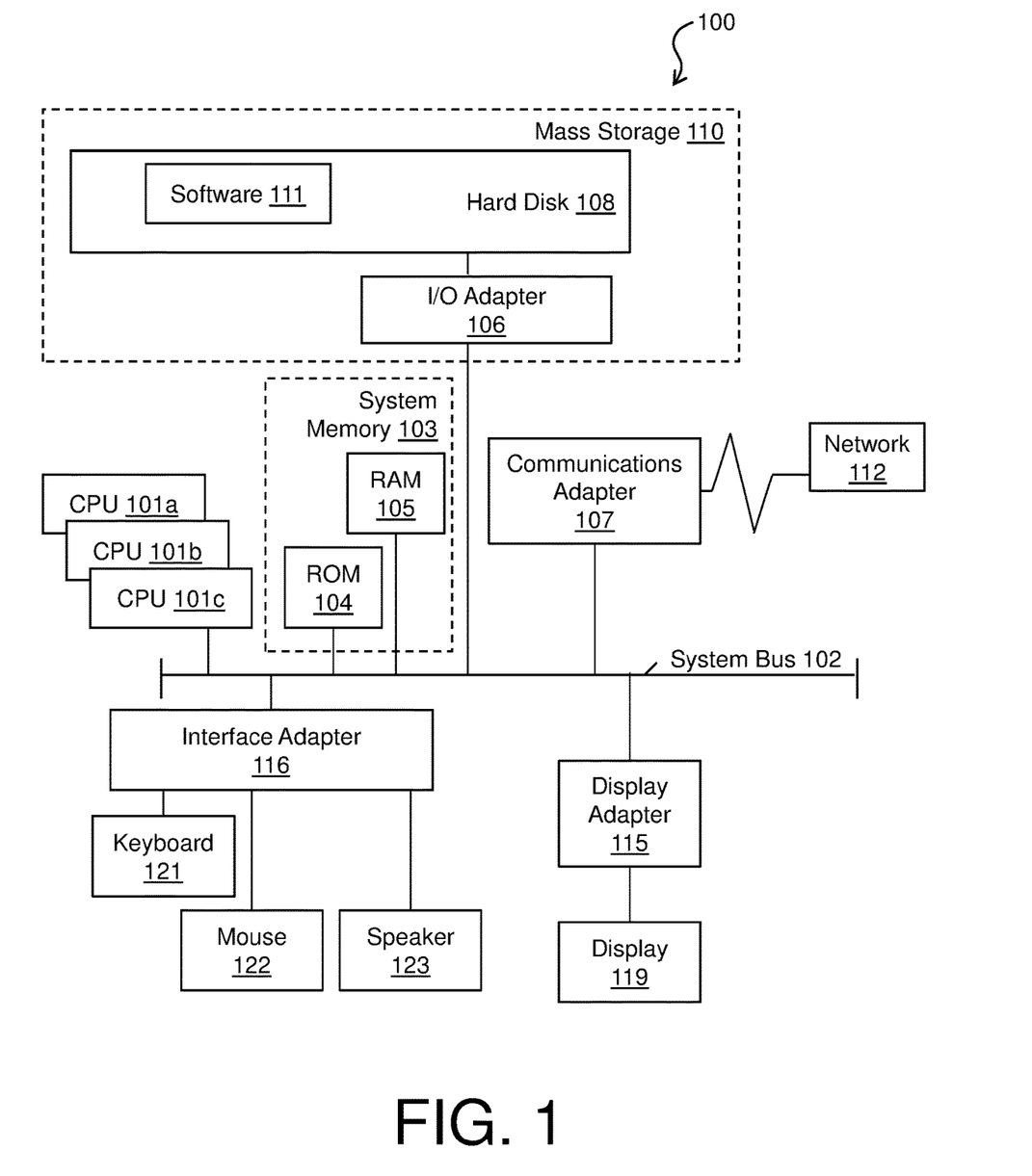
FIG. 1 is a block diagram of an example computer system for use in conjunction with one or more embodiments of memory tagging for sensitive data redaction in a memory dump.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computing system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
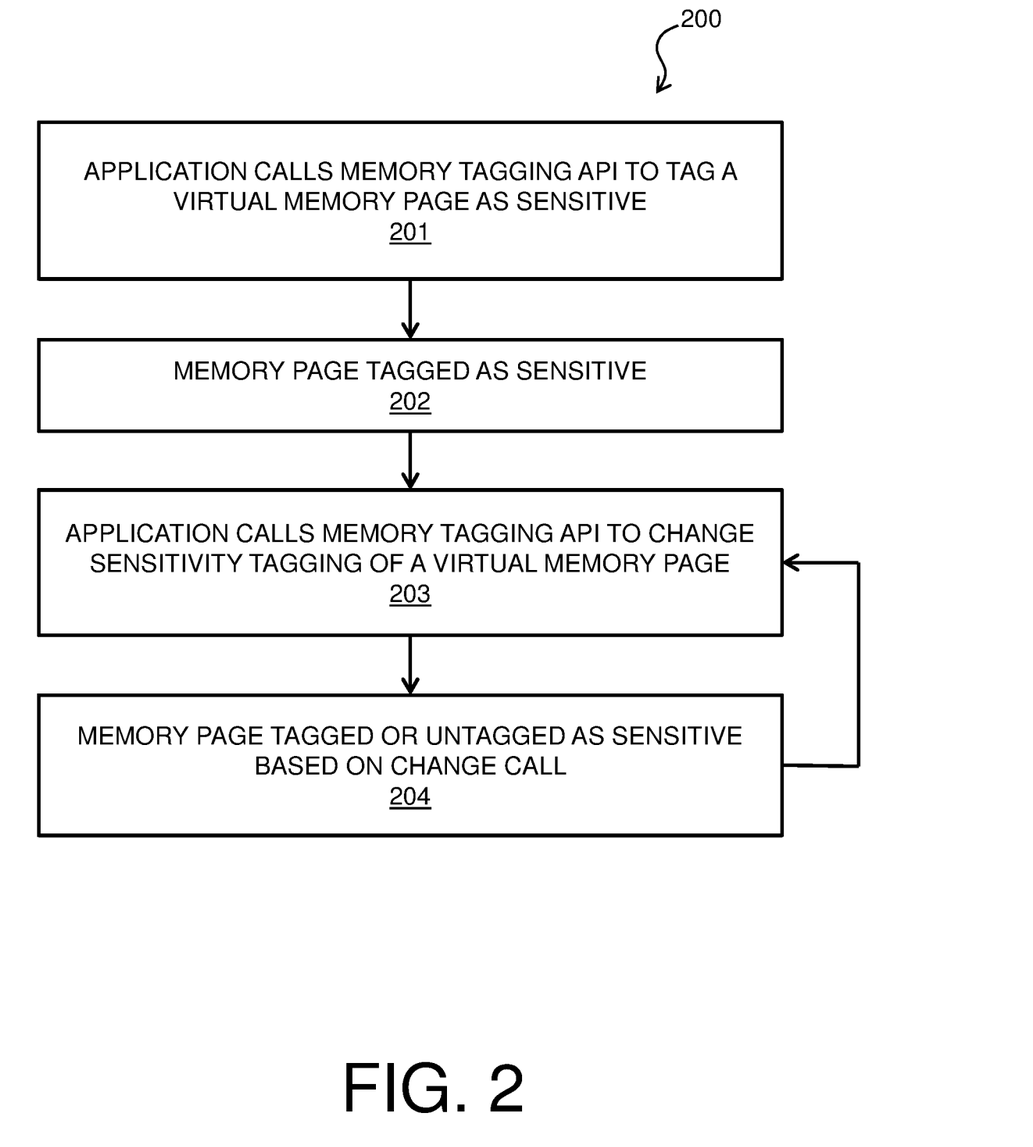
FIG. 2 is a process flow diagram of an example method for memory tagging for sensitive data redaction in a memory dump in accordance with one or more embodiments of the present invention.

FIG. 2 is a process flow diagram of a method 200 for memory tagging for sensitive data redaction in a memory dump in accordance with one or more embodiments of the present invention. The method 200 can be implemented with any suitable computing device, such as the computer system 100 of FIG. 1. In block 201 of FIG. 2, an application, which may be part of software 111 of FIG. 1, issues a call to a memory tagging API to tag a virtual memory page that is allocated to the application as containing sensitive data. The virtual memory page may be a subset of a block of virtual memory that is allocated to the application. The API call of block 201 may occur at the time of allocation of the virtual memory page in some embodiments; in other embodiments, the API call of block 201 may occur after allocation during the execution of the application. In block 202, the physical memory page corresponding to the virtual memory page is tagged as sensitive based on the API call of block 201. A sensitivity identifier may be included within the physical memory page in some embodiments. In block 203, as execution of the application continues, the application may call the memory tagging API to change the sensitivity tagging of any virtual memory page that is allocated to the application (i.e., to tag or untag the page as sensitive), and, in block 204, the physical memory page corresponding to the change call to the memory tagging API of block 203 is tagged or untagged as sensitive. Blocks 203 and 204 of method 200 of FIG. 2 may be repeated any appropriate number of times during the execution of an application. An application may be allocated any appropriate number and size of memory pages as part of a virtual address space. Any appropriate subset of the address space may be tagged and/or untagged as sensitive during execution of the application as described with respect to method 200 of FIG. 2, based on the memory tagging API calls that are included in the application. Multiple applications in a computer system may simultaneously implement method 200 of FIG. 2 in their respective address spaces during execution. FIG. 2 is discussed in further detail below with respect to FIG. 4.

Embodiments of a memory tagging API that operates according to embodiments of method 200 of FIG. 2 may be included in any appropriate OS, including but not limited to z/OS. A storage manager component in the OS may provide services to allocate virtual storage for programs. In some embodiments, the memory allocation services may accept a sensitivity keyword, e.g., SENSITIVE, to identify that the contents of an allocated memory location are sensitive. For example, specification of a SENSITIVE(Yes) keyword may tag a memory location as sensitive. A sensitivity keyword may be implemented in any appropriate OS memory allocation services. For example, various z/OS services, including but not limited to IARV64 (GETCOMMON, GETSTOR and GETSHARED); IARCP64 and IARST64; STORAGE OBTAIN; and CPOOL BUILD may accept a sensitivity keyword in calls to the services, as described above. Embodiments of a sensitivity keyword may be implemented in blocks 201 and 202 of FIG. 2.

While, in some embodiments, an application may choose to identify a memory object as sensitive at allocation time using a sensitivity keyword, the sensitivity of a memory object may not necessarily be known at the time of storage allocation. In some embodiments, tagging functionality may be included via a memory tagging API in subsequent memory allocation services via a change sensitivity keyword (e.g., CHANGEDATATYPE). For example, various z/OS services may accept a change sensitivity keyword, including but not limited to IARV64 and PGSER. For example, an application may use a change sensitivity keyword such as REQUEST=CHANGEDATATYPE SENSITIVE(YES) along with a memory address to mark a memory object as sensitive at any time after the memory object has been created. Embodiments of a change sensitivity keyword may be implemented in blocks 203 and 204 of FIG. 2.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
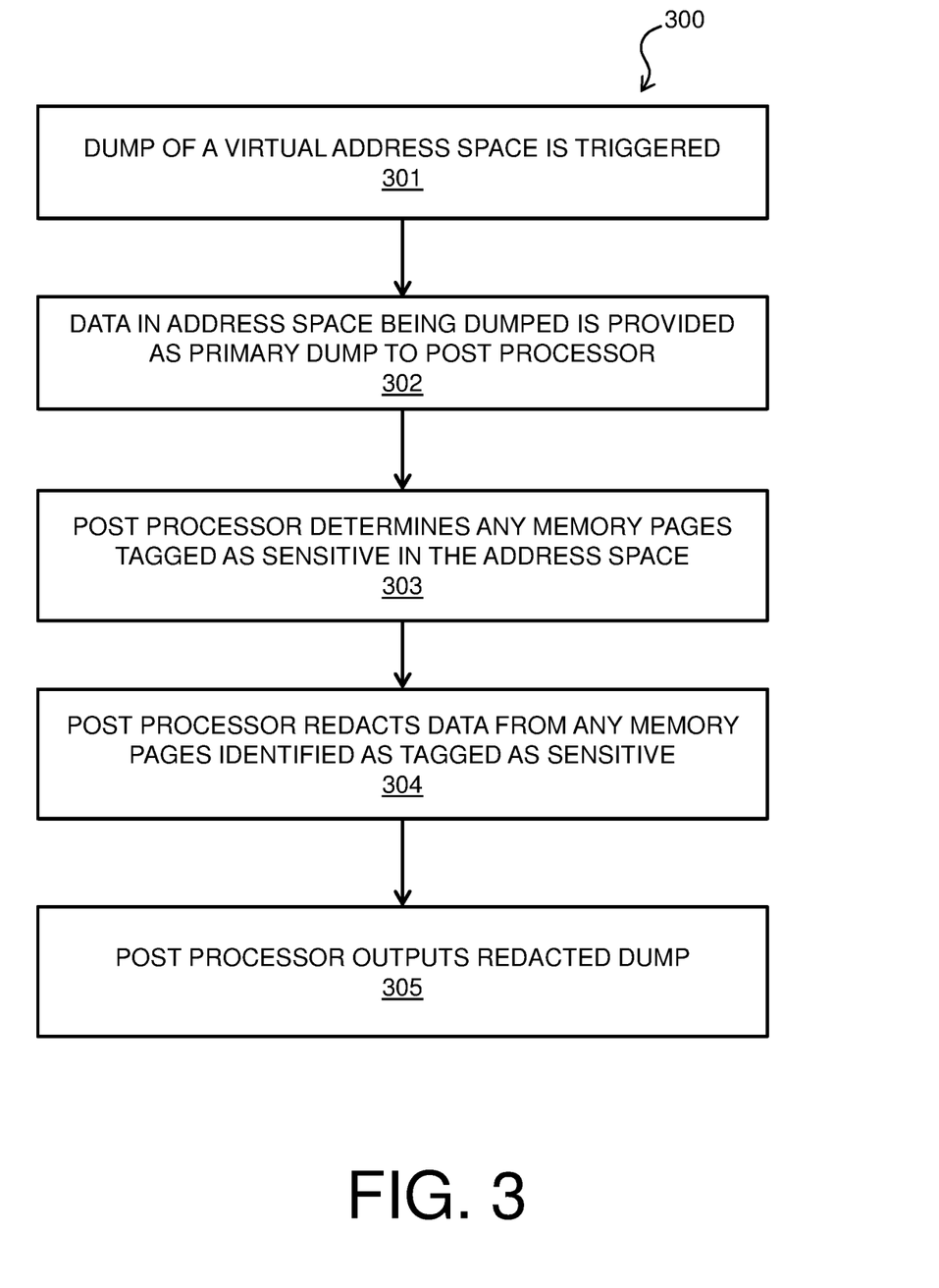
FIG. 3 is a process flow diagram of an example method for sensitive data redaction in a memory dump in accordance with one or more embodiments of the present invention.

FIG. 3 is a process flow diagram of a method 300 for sensitive data redaction in a memory dump in accordance with one or more embodiments of the present invention. The method 300 can be implemented with any suitable computing device, such as the computer system 100 of FIG. 1. In block 301, a dump of a virtual address space is triggered by, for example, an error in the computer system. The dump may be triggered in block 301 during execution of an application that is using the address space that targeted for the dump. In block 302, the data from the targeted address space is provided as a primary dump to a dumping module comprising a post processor. In block 303, the post processor determines whether any of the virtual memory pages in the virtual address space that is targeted for the dump are currently tagged as sensitive based on memory tagging that was performed as discussed above with respect to method 200 FIG. 2. In block 304, the post processor redacts (e.g., removes or encrypts) from the dump any data corresponding to any virtual address page that was determined to be tagged as sensitive in block 303. In block 305, the post processor outputs a redacted dump that does not include the sensitive data. Method 300 of FIG. 3 may be triggered whenever a memory dump is triggered in a computer system, at any time during execution of method 200 of FIG. 2. FIG. 3 is discussed below in further detail with respect to FIG. 5.

Method 300 of FIG. 3 may be implemented in conjunction with any appropriate OS. In embodiments of FIG. 3 that are included in a z/OS system, a post processor that receives the data that is being dumped as described with respect to block 302 may be part of a first failure data capture (FFDC) module. In some embodiments, post processing may be invoked via an interactive problem control system (IPCS) which may redact the tagged pages and create the secondary dump.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
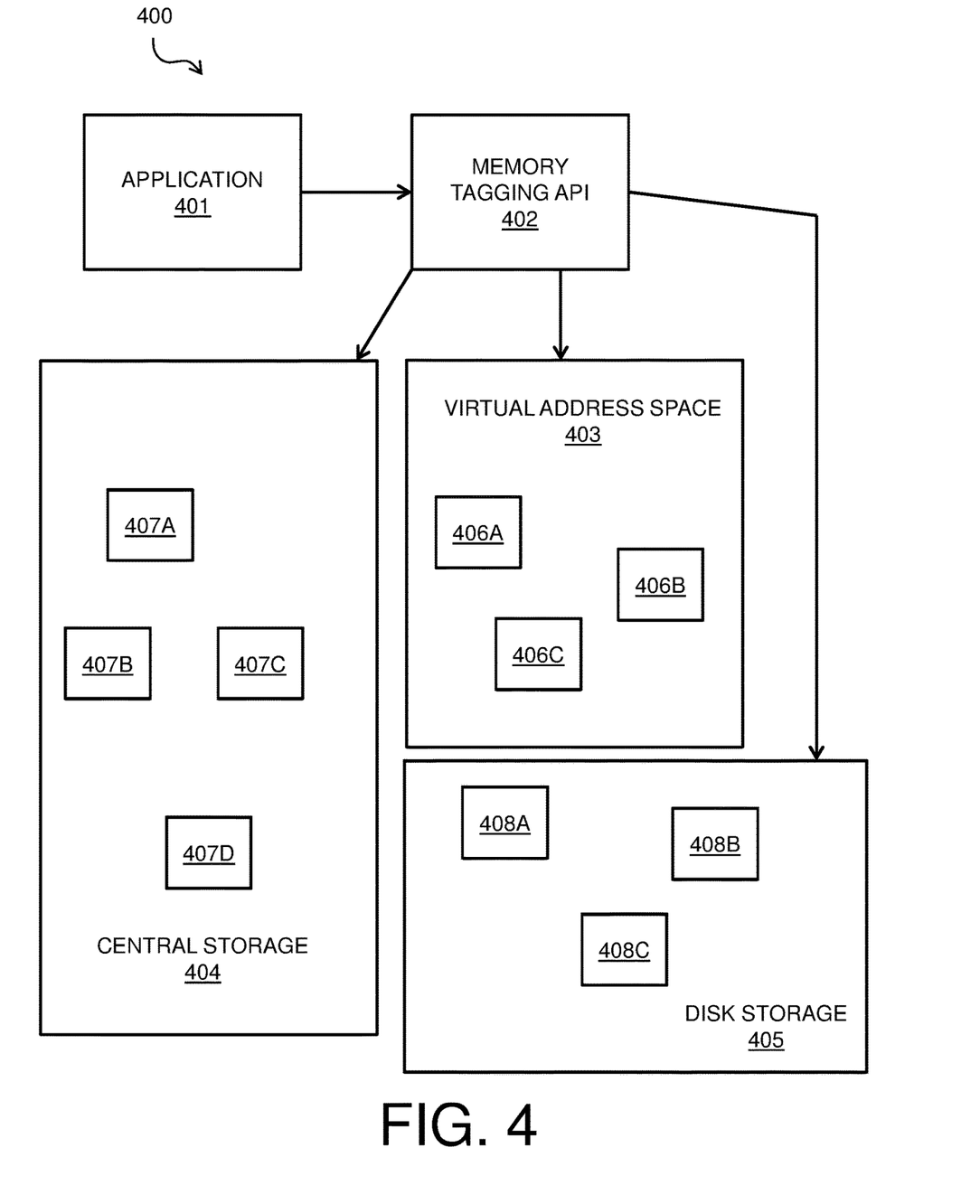
FIG. 4 is a block diagram of an example system for memory tagging for sensitive data redaction in a memory dump in accordance with one or more embodiments of the present invention.

FIG. 4 is a block diagram of a system 400 that includes memory tagging for sensitive data redaction in a memory dump in accordance with one or more embodiments of the present invention. System 400 includes an application 401 that is running on a computer system (e.g., computer system 100 of FIG. 1, as part of software 111). System 400 further includes a memory tagging API 402 that may be part of an OS of the computer system. The memory tagging API 402 may include commands to tag and untag designated memory pages, such as memory pages 406A-C, 407A-N, and 408A-N, as sensitive. A virtual address space 403 may be allocated to the application 401. The virtual address space 403 includes a plurality of virtual memory pages 406A-C that are currently tagged as sensitive. The virtual address space 403 also includes a plurality of virtual memory pages that are not tagged as sensitive. Central storage 404 includes a plurality of memory pages 407A-N that are tagged as sensitive by memory tagging API 402. Central Storage 404 also includes a plurality of memory pages that are not tagged as sensitive. Disk storage 405 includes a plurality of memory pages 408A-N that are tagged as sensitive by memory tagging API 402. Disk storage 405 also includes a plurality of memory pages that are not tagged as sensitive. Sensitive memory pages 406A-C, 407A-D, and 408A-C are each tagged via calls to memory tagging API 402 by an application such as application 401; the sensitivity tagging may be performed according to method 200 of FIG. 2.

It is to be understood that the block diagram of FIG. 4 is not intended to indicate that the computer system 400 is to include all of the components shown in FIG. 4. Rather, the computer system 400 can include any appropriate fewer or additional components not illustrated in FIG. 4 (e.g., additional memory components, applications, virtual address spaces, tagged and/or untagged memory pages, etc.). Further, the embodiments described herein with respect to computer system 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 5:
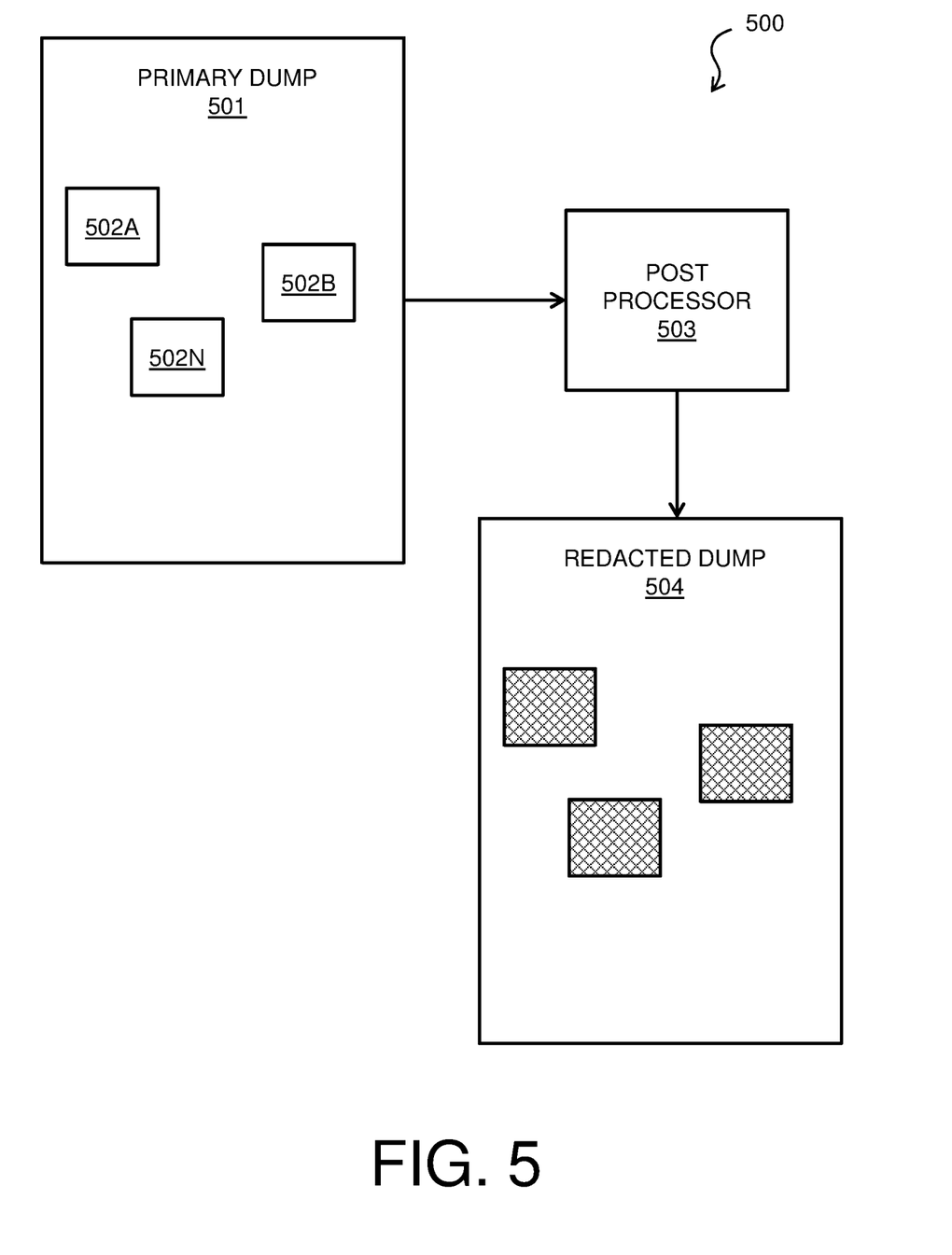
FIG. 5 is a block diagram of an example system for sensitive data redaction in a memory dump in accordance with one or more embodiments of the present invention.

FIG. 5 is a block diagram of a system 500 for sensitive data redaction in a memory dump in accordance with one or more embodiments of the present invention. System 500 includes a primary dump 501 of a virtual address space that is targeted for a memory dump, as described above with respect to method 300 of FIG. 3. The primary dump 501 may include all data corresponding to a virtual address space such as virtual address space 403 of FIG. 4. The primary dump 501 includes sensitive data that is located in tagged virtual memory pages, i.e., sensitive data 502A-N. Sensitive data 502A-N may be located in memory pages that were tagged as sensitive according to method 200 of FIG. 2. The primary dump 501 is provided to a post processor 503 of a computer system (e.g., computer system 100 of FIG. 1, as part of software 111). The post processor 503 identifies the data that is tagged as sensitive and redacts the identified data. The redacted data may be removed or encrypted in various embodiments. The post processor 503 then outputs a redacted dump 504 of the virtual address space, with the data corresponding to sensitive data 502A-N removed or encrypted. The redacted dump 504 may prevent unauthorized personnel from gaining access to sensitive, confidential, or otherwise protected information that would be available in primary dump 501.

It is to be understood that the block diagram of FIG. 5 is not intended to indicate that the computer system 500 is to include all of the components shown in FIG. 5. Rather, the computer system 500 can include any appropriate fewer or additional components not illustrated in FIG. 5 (e.g., additional dumps, modules, tagged or untagged memory pages, etc.). Further, the embodiments described herein with respect to computer system 500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system, comprising a processor configured to:
   receive a first call to a memory tagging application programming interface (API) from an application, wherein the first call designates a virtual memory page belonging to the application as containing sensitive data; and
   based on the first call to the memory tagging API, tag a physical memory page corresponding to the virtual memory page as sensitive, wherein tagging the physical memory page comprises setting a sensitivity identifier within the physical memory page.

2. The system of claim 1, wherein the first call to the memory tagging API corresponds to allocation of the virtual memory page to the application.

3. The system of claim 1, the processor configured to:
   receive a second call to the memory tagging API from the application, wherein the second call designates the virtual memory page as not containing sensitive data; and
   based on the second call to the memory tagging API, untag the physical memory page corresponding to the virtual memory page as sensitive.

4. The system of claim 1, wherein a plurality of virtual memory pages in a virtual address space that is allocated to the application are tagged as sensitive.

5. The system of claim 1, the processor configured to:
   based on a dump of a virtual address space including the virtual memory page being triggered, redact data corresponding to the tagged virtual memory page from the dump of the virtual address space.

6. The system of claim 5, wherein the redacting comprises removing the data from the dump.

7. The system of claim 5, wherein the redacting comprises encrypting the data in the dump.

8. A computer-implemented method, comprising:
   receiving, via a processor, a first call to a memory tagging application programming interface (API) from an application, wherein the first call designates a virtual memory page belonging to the application as containing sensitive data; and
   based on the first call to the memory tagging API, tagging, via the processor, a physical memory page corresponding to the virtual memory page as sensitive, wherein tagging the physical memory page comprises setting a sensitivity identifier within the physical memory page.

9. The computer-implemented method of claim 8, wherein the first call to the memory tagging API corresponds to allocation of the virtual memory page to the application.

10. The computer-implemented method of claim 8, the method comprising:
    receiving a second call to the memory tagging API from the application, wherein the second call designates the virtual memory page as not containing sensitive data; and
    based on the second call to the memory tagging API, untagging the physical memory page corresponding to the virtual memory page as sensitive.

11. The computer-implemented method of claim 8, wherein a plurality of virtual memory pages in a virtual address space that is allocated to the application are tagged as sensitive.

12. The computer-implemented method of claim 8, the method comprising:
    based on a dump of a virtual address space including the virtual memory page being triggered, redact data corresponding to the tagged virtual memory page from the dump of the virtual address space.

13. The computer-implemented method of claim 12, wherein the redacting comprises removing the data from the dump.

14. The computer-implemented method of claim 12, wherein the redacting comprises encrypting the data in the dump.

15. A computer program product comprising:
    a computer readable storage medium having program instructions embodied therewith, the program instructions executable by a processing device to cause the processing device to perform a method comprising:
    receiving a first call to a memory tagging application programming interface (API) from an application, wherein the first call designates a virtual memory page belonging to the application as containing sensitive data; and
    based on the first call to the memory tagging API, tagging a physical memory page corresponding to the virtual memory page as sensitive, wherein tagging the physical memory page comprises setting a sensitivity identifier within the physical memory page.

16. The computer program product of claim 15, wherein the first call to the memory tagging API corresponds to allocation of the virtual memory page to the application.

17. The computer program product of claim 15, the method comprising:

receiving a second call to the memory tagging API from the application, wherein the second call designates the virtual memory page as not containing sensitive data; and based on the second call to the memory tagging API, untagging the physical memory page corresponding to the virtual memory page as sensitive.

18. The computer program product of claim 15, wherein a plurality of virtual memory pages in a virtual address space that is allocated to the application are tagged as sensitive.

19. The computer program product of claim 15, the method comprising:

based on a dump of a virtual address space including the virtual memory page being triggered, redact data corresponding to the tagged virtual memory page from the dump of the virtual address space.

20. The computer program product of claim 19, wherein the redacting comprises one of removing the data from the dump and encrypting the data in the dump.

\* \* \* \* \*